(12) United States Patent
Kriezman

(10) Patent No.: US 10,787,777 B2
(45) Date of Patent: Sep. 29, 2020

(54) PARKING GATE BARRIER ROD PROJECTING SYSTEM

(71) Applicant: Omri Kriezman, Givataim (IL)

(72) Inventor: Omri Kriezman, Givataim (IL)

( * ) Notice: Subject to any disclaimer, the term of this patent is extended or adjusted under 35 U.S.C. 154(b) by 133 days.

(21) Appl. No.: 16/064,487

(22) PCT Filed: Nov. 3, 2016

(86) PCT No.: PCT/IB2016/056616
§ 371 (c)(1),
(2) Date: Jun. 21, 2018

(87) PCT Pub. No.: WO2017/115166
PCT Pub. Date: Jul. 6, 2017

(65) Prior Publication Data
US 2019/0024333 A1    Jan. 24, 2019

Related U.S. Application Data

(60) Provisional application No. 62/271,389, filed on Dec. 28, 2015.

(51) Int. Cl.
| E05B 65/00 | (2006.01) |
| E01F 13/06 | (2006.01) |
| G09F 19/18 | (2006.01) |
| G06K 9/46 | (2006.01) |
| G06K 9/78 | (2006.01) |
| G06K 9/00 | (2006.01) |
| H04L 29/08 | (2006.01) |

(Continued)

(52) U.S. Cl.
CPC .......... *E01F 13/06* (2013.01); *G06K 9/00832* (2013.01); *G06K 9/46* (2013.01); *G06K 9/78* (2013.01); *G06Q 30/0251* (2013.01); *G09F 19/18* (2013.01); *H04L 67/306* (2013.01); *G06K 9/3258* (2013.01); *G06K 2209/15* (2013.01); *H04W 4/40* (2018.02); *H04W 4/80* (2018.02); *H04W 8/18* (2013.01)

(58) Field of Classification Search
CPC ............. G06K 9/00832; G06K 9/3258; G06K 2209/15; G06K 9/78; G06K 9/46; E01F 13/06; H04L 67/306; G06Q 30/0251; H04W 8/18; H04W 4/80; H04W 4/40; H04W 4/38; H04W 8/183
USPC ....................................... 49/35, 49
See application file for complete search history.

(56) References Cited

U.S. PATENT DOCUMENTS

| 3,589,066 A * | 6/1971 | Fisher ..................... E01F 13/06 49/35 |
| 4,016,679 A * | 4/1977 | Ellefson .................. E01F 13/10 49/49 |

(Continued)

*Primary Examiner* — Chi Q Nguyen
(74) *Attorney, Agent, or Firm* — Mark M. Friedman

(57) ABSTRACT

A parking gate barrier rod projecting system, the system comprising: a projection screen material attached to at least a portion of a parking gate rod and a projector. The projector is adapted to project digital content on the projection screen material. The digital content is adapted to be fitted on the front projection screen material to thereby allowing a person in a vehicle arriving at the parking gate rod to view the digital content. A sensor or a camera may detect when the parking gate barrier rod is opened and may send a control command to the projector to stop projecting or to darken the projecting in order to avoid dazzling of a person in the vehicle.

14 Claims, 6 Drawing Sheets

(51) Int. Cl.
*G06Q 30/02* (2012.01)
*G06K 9/32* (2006.01)
*H04W 4/40* (2018.01)
*H04W 4/80* (2018.01)
*H04W 8/18* (2009.01)

(56) References Cited

U.S. PATENT DOCUMENTS

| | | | |
|---|---|---|---|
| 9,615,066 B1 * | 4/2017 | Tran | H04N 7/183 |
| 2007/0068079 A1 * | 3/2007 | Morgan | E01F 13/06 49/49 |
| 2019/0056498 A1 * | 2/2019 | Sonn | G01S 17/18 |
| 2020/0068434 A1 * | 2/2020 | Pedersen | G06T 3/40 |

\* cited by examiner

PARKING GATE BARRIER ROD PROJECTING SYSTEM

FIELD OF THE INVENTION

The present invention relates to projection systems in general and to projection systems for advertising in particular.

BACKGROUND OF THE INVENTION

A projector, also called a Data\Video projector display system, is a display system that projects an enlarged image on a screen. Such devices are commonly used in presentations. Such a screen is typically a front or rear projection material screen commonly used in classrooms and cinema screen.

SUMMARY OF THE INVENTION

The term computing device refers herein to a device that includes a processing unit. Examples for such device are a personal computer, a laptop, a server, a tablet a cellular device and IOT (internet of things) device.

The present invention provides systems and methods for displaying digital media on a surface of a parking gate barrier rod. There is, thus provided in accordance with embodiments of the present invention a system for displaying digital media content on a projection screen material attached or embedded into the surface of the parking gate barrier rod, turning the surface into a dynamic video display. The digital media content may include advertising and information and is projected by a projector toward the parking gate barrier rod. The term digital media content refers herein to graphic images, video images and text or a combination thereof.

The digital media content is ingested into the projection device from the media memory device and or from display control subsystems connected into the projector display device inputs.

The system may be responsive to a vehicle ID (identification) plate and or a vehicle driver Cellular Phone ID number and may ingest advertising and\or information personalized to vehicle or driver that is identified by the system upon arriving before or nearby the parking gate barrier rod. In such a case, the digital media content that is displayed on the surface of parking gate is specifically intended for a vehicle or to the driver that arrives at the parking gate barrier rod.

One exemplary embodiment of the disclosed subject matter is a parking gate barrier rod projecting system, the system comprising: a projection screen material attached to at least a portion of a parking gate barrier rod; and a projector, wherein the projector being adapted to project digital media content on the projection screen material; wherein the digital media content being adapted to be fitted on the projection screen material to thereby exposing the digital media content to a person in a vehicle arriving at the parking gate barrier rod.

One other exemplary embodiment of the disclosed subject matter is a parking gate barrier rod projecting system, the system comprising a car recognition module, a capturing device and a display control module; wherein the capturing device is configured for capturing an image of a vehicle arriving at a parking gate barrier rod and for transferring the image to the car recognition module and wherein the car recognition module is configured for extracting a car plate number from the image and for transferring the plate number to the display control module; wherein the display control module is configured for identifying a user associated with the plate number and for selecting media content according to a profile of the user and for transferring the media content to the projector for projecting the media content on the parking gate barrier rod.

One other exemplary embodiment of the disclosed subject matter is a parking gate barrier rod projecting system comprising an application; and a display control module; wherein the application is configured for identifying the arrival of a user of the application at a parking gate barrier rod and for transferring the user identification to the display control module; wherein the display control module is configured for selecting the media content according to a profile of the user and for transferring the media content to a projector for projecting the media content on the parking gate barrier rod to, thereby, personalizing the media content in accordance with the user.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 3:
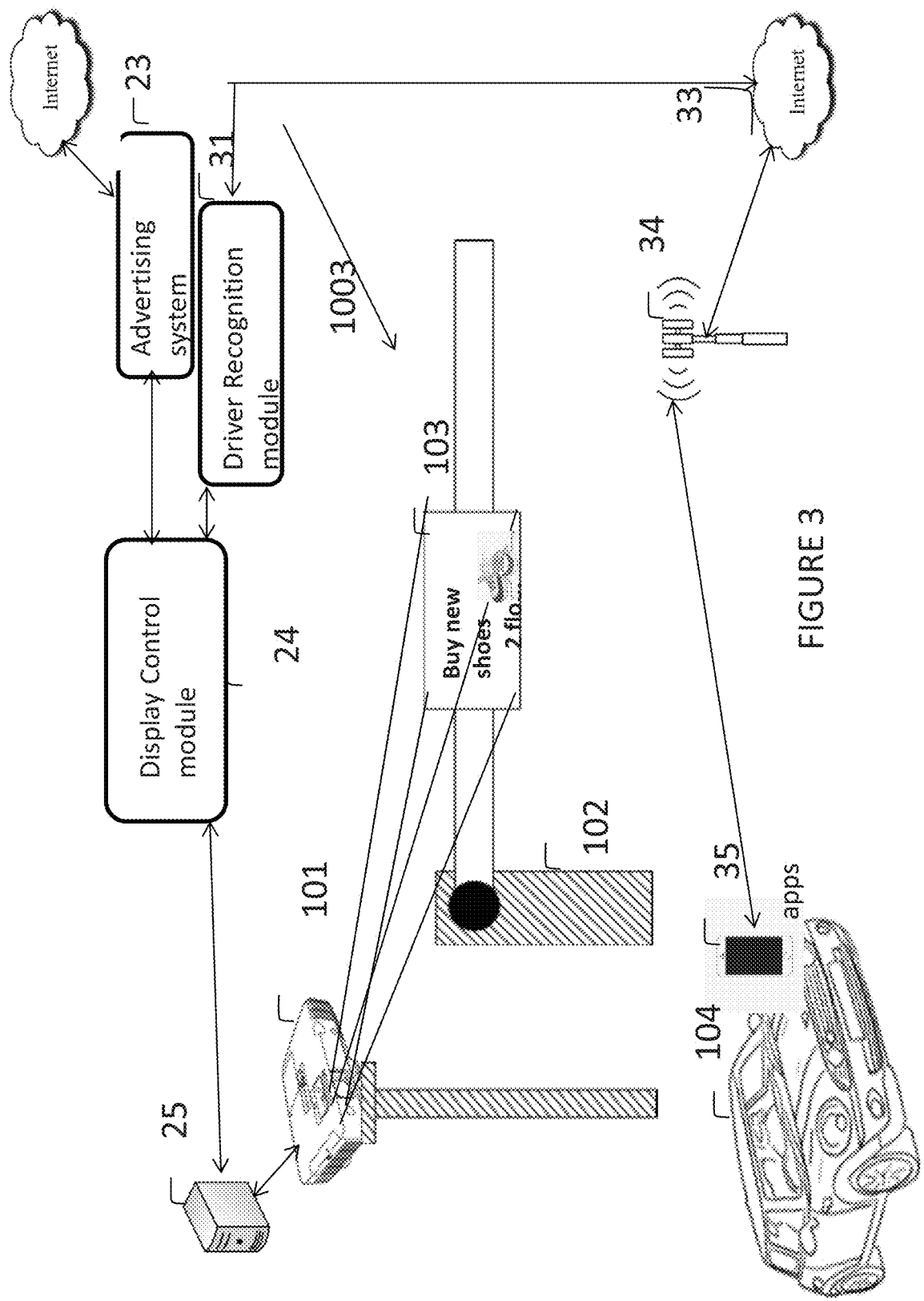
Figure 4:
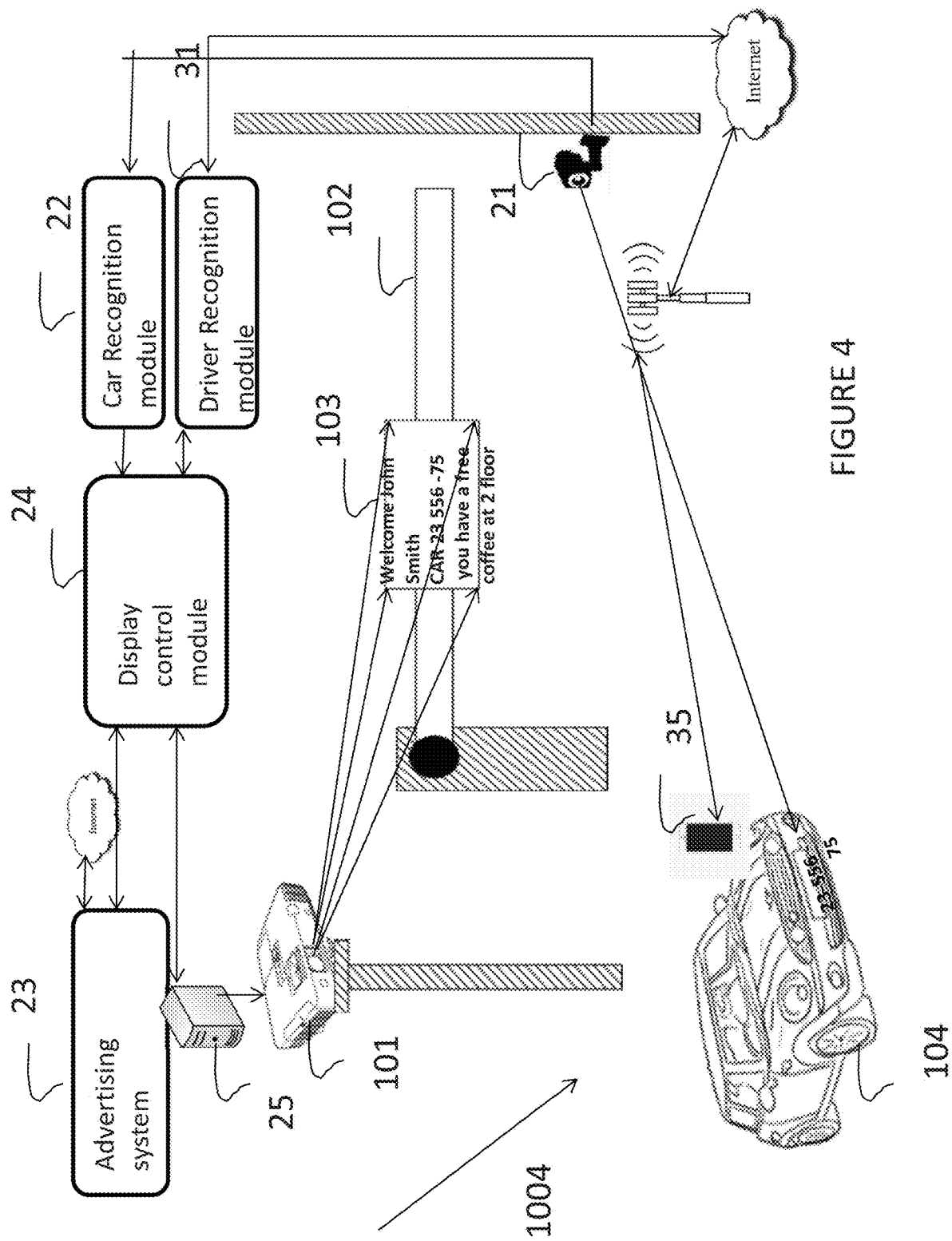

FIG. 3 shows a block diagram of a parking gate barrier rod projection system with an application for personalizing the projecting, in accordance with some exemplary embodiments of the disclosed subject matter; and FIG. 4 shows a block diagram of parking gate barrier rod projection system with an application for personalizing the projecting, combined with a car recognition module, in accordance with some exemplary embodiments of the disclosed subject matter.

DETAILED DESCRIPTION

Figure 1A:
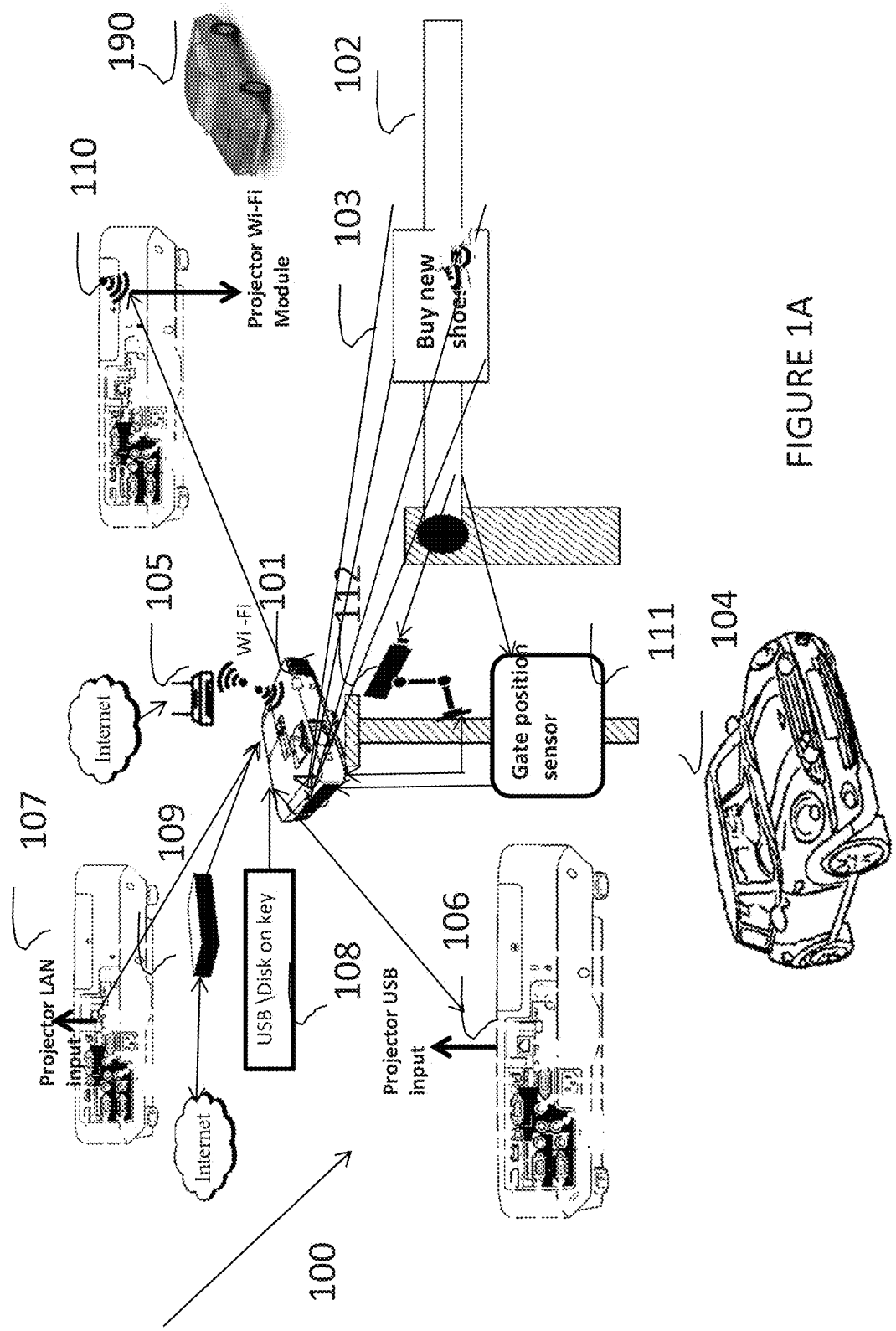
FIG. 1A shows a block diagram of a parking gate barrier rod projection system with a projector utilizing autonomous viewing and displaying features for displaying the digital media content, in accordance with some exemplary embodiments of the subject matter.

FIG. 1A shows a block diagram of a parking gate barrier rod projection system with a projector utilizing autonomous viewing and displaying features for displaying the digital media content, in accordance with some exemplary embodiments of the subject matter.

System 100 includes a projector 101, a parking gate barrier rod 102, front projection screen material 103, a gate positioning sensor 111 and a camera 112.

System 100 provides the displaying of digital media content on the front projection screen material 103 that is attached to at least a portion of the parking gate barrier rod 102 such that a person in a vehicle arriving at the parking barrier gate barrier rod 102 views the digital media content upon arriving. The digital media content may be related to the location of the parking gate barrier rod 102. For example, if the parking gate barrier rod 102 is located in a parking lot of a mall, the digital media content may include advertising of shops in the mall for advertising the shops to vehicles that are parking in the parking lot of the mall.

The projector 101 may be video\data projector such as Epson Power-lite 1945W by the EPSON SEIKO Corporation of Nagano Japan. The projector 101 is mounted near by the parking gate barrier rod 102. The projector 101 is configured for projecting the digital media content on the front projection screen material 103. The projector 101 is adapted to adjust the projecting such that the digital media content is displayed on the front projection screen material 103 by, for example, utilizing geometric correction, zoom and focus features of the projector 101.

The projected image appeared on the front projection screen material 103 may be edited to fit exactly the size and shape of the front projection screen material 103. The editing may be done, for example by graphic editing software such as the ADOBEE photo-shop software.

The projector 101 comprises autonomous viewing features such as the internal viewer of Epson Power lite 1940W Projector by the EPSON SEIKO Corporation of Nagano Japan. The autonomous viewing features provide the displaying of the digital media content from memory device connected to the projector 101.

According to embodiments disclosed by FIG. 1A the digital media content is received from an internal memory device such as a USB connection 106 connected to a disk on key 108 or a LAN module 107 connected to a LAN router 109, or via the projector WI-FI module 110 which is connected to the WI-FI router 105.

In some other embodiment the projector 101 may receive streamed data from the internet via the WI-FI module 110 and may display the received digital media consent. Such projector may be, for example, Epson Power lite 1945W by the EPSON SEIKO Corporation of Nagano Japan. The Digital media content may be streamed from Wi-Fi router 105 into the projector 101. The projector 101 projects the streamed digital media content toward the front projection screen material 103.

In some other embodiment the projector 101 may receive streamed data from the internet via the LAN module 107 and may display the received digital media consent. Such a projector may be for example, Epson Power lite 1945W by the EPSON SEIKO Corporation of Nagano Japan. The digital media content may be streamed from (Local Area Network) router 109 to the projector 101 through the LAN module 107. The projector 101 projects the streamed digital media content toward the front projection screen material 103.

The front projection screen material 103 is attached by adhesive material such as Tesa Powerbond tape by the TESA SE of Norderstedt Germany to at least 5% of the parking gate barrier rod 102 or is embedded within the parking gate barrier rod 102. The front projection screen material 103 is made of high gain projection screen material such as VUTEC SILVERSTAR Projection screen by the VUTEC Corporation of Coral Springs of Florida USA.

The passengers of vehicle 104 arrive at the parking gate barrier rod 102 view the digital media content projected from the projector 101 on the projection screen material 103.

When the parking gate barrier rod 102 is opened, the passengers of a car 190 that exits the parking may be dazzled from the projector. In order to avoid the dazzling, a motion detection camera 112 such as Mobotix S15 by Mobotix AG of LANGMEIL Germany may identify that the parking gate barrier rod 102 is opened and may send a control command to the projector 101 for darkening the projecting. An example of a projector that can receive such a command is Epson Power lite 1945W by the EPSON SEIKO Corporation of Nagano Japan.

In another embodiment the positioning range sensor 111 may identify by a laser beam that the parking gate barrier rod 102 is opened and may send a control command to the projector 101 to stop projecting or to darken\blank the projecting. Such a positioning range sensor 111 may be, for example, Acuity AR2500 Laser detector of the SCHMIDT INDUSTRIES inc. Portland Oreg. USA FIG. 1B shows a block diagram of a parking gate barrier rod projection system connected to external resources of digital media, in accordance with some exemplary embodiments of the subject matter.

System 1001 includes a projector 101, a parking gate barrier rod 102, a front projection screen material 103, a gate positioning sensor 111 and a camera 112. System 1001 provides displaying of digital media content on the projection screen material that is attached to at least a portion of the a parking gate barrier rod such that a person in a vehicle arriving at the a parking gate barrier rod views the digital media content upon arriving to the parking gate barrier rod. According to some embodiments the projection screen material is attached to at least 5% of the parking gate barrier rod. The digital media content may be related to the location of the parking gate barrier rod 102. For example, if the parking gate barrier rod 102 is located in a parking lot of a mall, the digital media content may include advertising of shops in the mall for advertising the shops to vehicles that are parking in the parking lot of the mall.

The projector 101, the parking gate barrier rod 102, the front projection screen material 103, the gate positioning sensor 111 and the camera 112 are described in greater details in FIG. 1A.

Figure 1B:
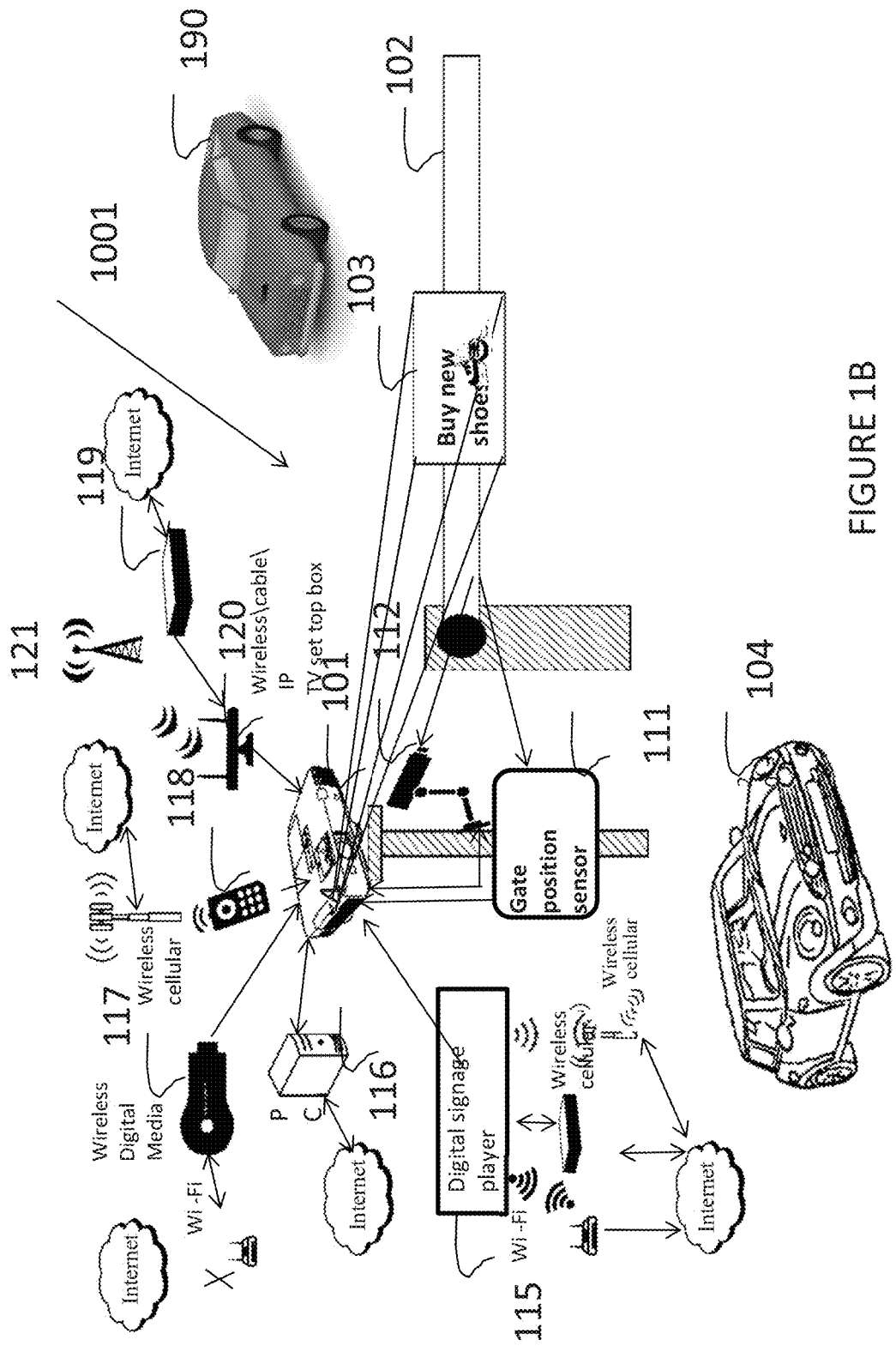
FIG. 1B shows a block diagram of a parking gate barrier rod projection system connected to external resources of digital media content, in accordance with some exemplary embodiments of the subject matter.

According to embodiments disclosed by FIG. 1B, the digital media content may be received from a digital signage player 115, a personal computer 116, a wireless digital media streamer 117, a cellular device 118, and a TV set top box 120.

The digital signage player 115 may receive the digital media content via Wi-Fi or Via Cellular connection and may feed the digital media content to the projector 101 via VGA or HDMI connection. Typically the digital media content is stored on an SD card of the digital signage player 115. The digital signage player 115 may be connected to LAN network. Such digital signage player 115 may be, for example, Bright sign XD1132 Manufacture by the BRIGHT SIGN Corporation of Los Gatos, Calif., USA or Gefen DS Wi-Fi plus by the GEFEN LLC of Chatsworth, Calif. by WD TV media Player manufacture or by the WESTERN DIGITAL Corporation of Irvine Calif. USA.

The personal computer 116 may be connected to the projector 101 via HDMI and or Analog Video output.

Examples of such personal computer are such as HP Envy Phoenix 810-230 QE Desktop PC by the HP Corporation of Palo Alto, Calif. USA.

The wireless digital media streamer 117 may be, for example Googel Chromecast by The GOOGLE Inc of Mountain view, CA, USA The TV set top box 120 may be wireless or IP TV such as THD603QC Hybrid T2 by Telergy of Hilversum the Netherland. The TV set top box 120 may be connected to the projector 101 via HDMI connection. The wireless TV set top box 120 may receive the digital media content that is broadcasted via the Wireless terrestrial 121 or via the IP TV (Television) cable network 119.

The cellular device 118 may be, for example, a cellular telephone or a tablet such as the APPLE Ipone 6 By the APPLE corporations of Cupertino Calif. USA. The cellular device 118 may be connected to the projector 101 with an HDMI (High Definition Multi Media) cable.

Figure 1C:
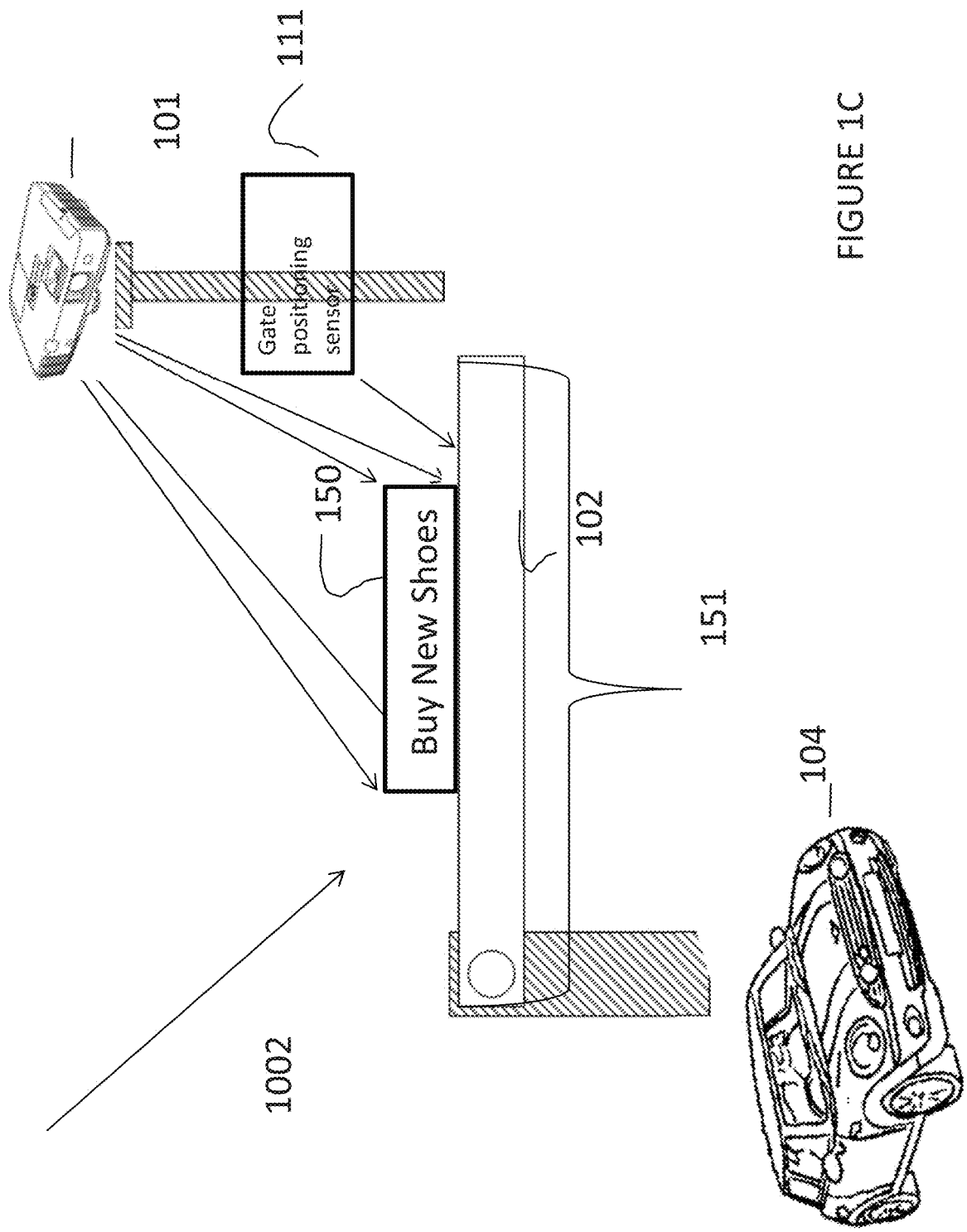
FIG. 1C shows a block diagram of a parking gate barrier rod projection system with rear projecting capabilities, in accordance with some exemplary embodiments of the subject matter.

FIG. 1C shows a block diagram of a parking gate barrier rod projection system with rear projecting capabilities, in accordance with some exemplary embodiments of the subject matter.

System 1002 includes a projector 101, a parking gate rod 102 and a rear projection screen material 150. System 1002 provides the displaying of digital media content on the rear projection screen material 150 that is attached to upper edge of parking gate barrier rod 102. The digital media content is projected by the projector 101 that is located behind the parking gate rode 102. The attachment may be performed by utilizing adhesive material such as Tesa Powerbond tape by the TESA SE of Norderstedt Germany/

The rear projection material 150 may be, for example, Flexiglass Pro of the SCREEN INNOVATION of Austin Tex.

The rear projection screen material 150 enables to locate the projector 101 behind the parking gate rod 102. In some cases the rear projection screen material 150 provides better display of the digital media content comparing with the front projection screen material (not shown in this figure).

A person in the vehicle 104 arriving at the parking gate barrier rod 102 views the digital media content upon arriving to the parking. The digital media content may be related to the location of the parking gate barrier rod. For example, if the parking gate barrier rod 102 is located in a parking lot of a mall, the digital media content may include advertising of shops in the mall for advertising the shops to vehicles that are parking in the parking lot of the mall.

When the parking gate barrier rod 102 is opened, the passengers of a vehicle 104 may be dazzled by the projector 101. In order to avoid the dazzling a detecting mean such as a positioning range sensor 111 may identify by a laser beam that the parking gate barrier rod 102 is opened and may send a control command to the projector 101 to stop projecting or to darken\blank the projecting.

Figure 2:
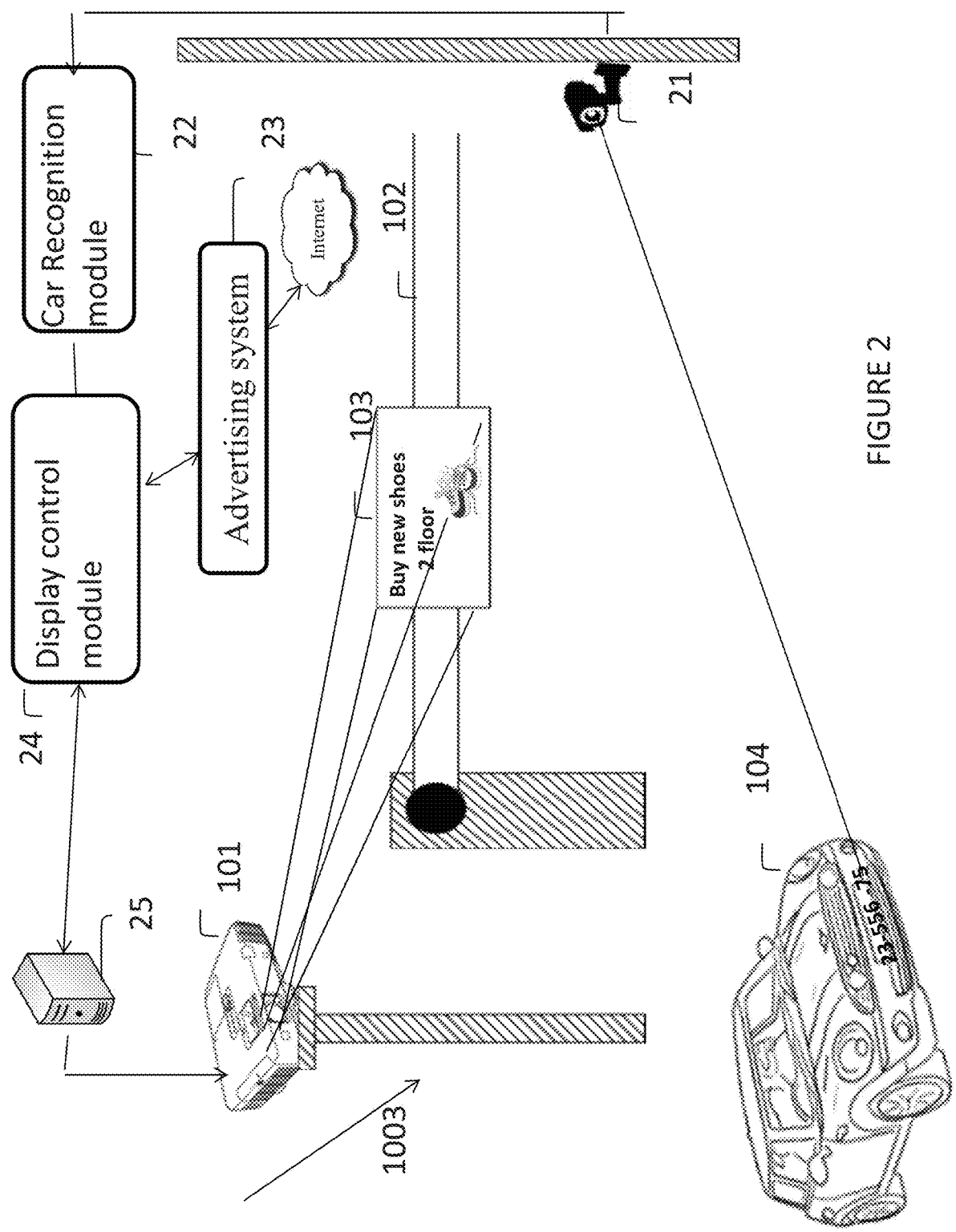
FIG. 2 shows a block diagram of a parking gate barrier rod projection system with a car recognition module, in accordance with some exemplary embodiments of the disclosed subject matter.

FIG. 2 shows a block diagram of a parking gate barrier rod projection system with a car recognition module, in accordance with some exemplary embodiments of the disclosed subject matter;

System 1003 includes a projector 101, parking gate barrier rod 102, projection screen material 103, a capturing device 21, car recognition module 22, display control module 24, advertising system 23 and a computer device 25.

System 1003 provides the displaying of digital media content on the projection screen material 103 that is attached to at least a portion of the parking gate barrier rod 102 such that a person in a vehicle arriving at the parking gate barrier rod 102 views the digital media content.

Additionally system 1003 enables to personalize the digital media content that is displayed on the projection screen material 103 according to the identification of the vehicle 104. The personalization is performed for users who are registered to the system and who provide their car plate number and other identification information upon registering to the system. Such personalization enables to project to the user digital media content that may be relevant to him; for example information regarding a sale of a product the he or she is interested in and that is currently being sold in the mall.

The projector 101, the parking gate barrier rod 102 and the projection screen material 103 are described in greater details in FIG. 1.

The capturing device 21 is configured for capturing an image of the vehicle 104 that arrives at the parking lot. The capturing device 21 may be a camera or any other device for capturing images or videos. The capturing is performed when the vehicle 104 is in proximity with the parking gate barrier rod 102. The capturing device 21 communicates with the car recognition module 22 for transferring the image of the vehicle 104 to the car recognition module 22. The communications may be via wired or wireless network, for example, via WiFi. Examples of such a capturing device are Mobotix S15 by Mobotix AG of Langmeil Germany The car recognition module 22 may be a computing device that utilizes methods such as optical character recognition for extracting the plate number of the vehicle 104 from the image that is transferred from the capturing device 21. The car recognition module 22 utilizes automatic number plate recognition (ANPR) methods. Examples of such modules are CAR Reader of Schmitz Gmbh of Regensburg Germany. The car recognition module 22 transmits a message with the plate number to the display control module 24. The communication with the display control module 24 may be wired or wireless.

The display control module 24 may be a computing device that is connected to a database or that includes a database. The database includes details about the users that have registered to the system. The database includes the vehicle plate number of each user. The display control module 24 receives the plate number from the car recognition module 22 and searches for the identification of the user in the data base. The display control module 24 retrieves from internal or external database personal information about the user who is associated with the plate number. The display control module 24 may select the digital media content to the user according to the personal information. Such digital media content may include advertisements and coupons. Such digital media content may be received from the advertising system 23. The display control module 24 may be connected to the computing devices 25 in order to transfer the digital media content to the projector 101.

The computing device 25 streams the digital media content to the projector 101 for projecting the digital media content on the projection screen material 103 and thus, for allowing the driver of the vehicle to view personalized information.

If the vehicle is not recognized by the system 1001, the display control module 24 may transfer default content to the projector 101 via the computing device 25 or may instruct the projector 101 to play default content.

FIG. 3 shows a block diagram of a parking gate barrier rod projection system with an application for personalizing the projecting, in accordance with some exemplary embodiments of the disclosed subject matter.

System 1003 includes a projector 101, a parking gate barrier rod 102, a projection screen material 103, a driver recognition module 31, a display control module 23, a computer device 25, an application 35 and an advertiser subsystem 23.

System 1003 provides the displaying of digital media content on the projection screen material 103 that is attached to at least a portion of the parking gate barrier rod 102 such that a person in a vehicle 104 arriving at the parking gate barrier rod 102 views the digital media content upon arriving to the parking.

Additionally system 1003 enables to personalize the digital content that is displayed on the projection screen material 103 according to the identification of the user by the application 35. The personalization is performed for users who are registered to the system and who download the application 35. Such personalization enable to project to the user digital media content that may be relevant to him. For example information regarding a sale of a product that he or she is interested in and that is currently is sold in the mall.

The projector 101, the parking gate barrier rod 102 and the projection screen material 103 are described in greater details in FIG. 1.

The driver of the vehicle 104 installs the application 35 in his mobile device. The mobile device may be a cellular device or a tablet or a computing device installed in the vehicle 104. Upon arriving at the parking lot the mobile device sends an identification code to the driver recognition system 31 via the cellular network 34 and the internet network 33.

The driver recognition module 31 identifies the driver upon receiving the code. The identification may be by identifying the location by the GPS of the mobile device.

The display control module 24 may be a computing device that is connected to a database or that includes a database. The database includes profiles of the users that have registered to the system. The profiles may include the history of purchases that may be received from the advertising system 23. The profile may include details that are entered by the user upon registering. The display control module 24 receives identification of the user and retrieves from the internal or the external database (not shown) personal information about the user who is associated with the user identification provide from the application 35. The display control module 24 may select the digital media content according to the personal information. Such digital media content may include advertisements and coupons. Such digital media content may be received from an advertising system 23. The display control module 24 streams the personalized digital media content to the projector 101 via the computing device for projecting the personalized digital media content on the projection material screen 103 for allowing the driver of the vehicle 104 to view personalized information.

If the vehicle is not recognized by the system 1001, the display control module 24 may transfer default content to the projector 101 or may instruct the projector 101 to play default content.

FIG. 4 shows a block diagram of a parking gate barrier rod projection system with an application for personalizing the projecting, combined with car recognition module in accordance with some exemplary embodiments of the disclosed subject matter.

System 1004 provides the displaying of digital media content on the projection screen material 103 that is attached to at least a portion of the parking gate barrier rod 102 such that a person in a vehicle 104 arriving at the parking gate barrier rod 102 views the digital media content upon arriving to the parking.

Additionally system 1004 enables to personalize the digital content that is displayed on the surface for projection screen material 103 according to the identification of the vehicle 104 or according to an the application 35 that is installed in the mobile device of the driver of the vehicle 104 or in the vehicle 104. The personalization is performed for users who are registered to the system. Such personalization enables to project to the user digital media content that may be relevant to him. The personalized message may include the name of the registered user and the vehicle 104 plate number. For example information regarding a sale of a product the he or she is interested in and that is currently is sold in the mall.

System 1004 includes a projector 101, parking gate barrier rod 102, a projection screen material 103, a driver recognition module 31, a display control module 24, a computer device 25, an application 35, a capturing device 21, an advertiser subsystem 23 and a car recognition module 22.

The projector 101, parking gate barrier rod 102, projection screen material 103, the driver recognition module 31, the display control module 23, the computing device 25, the application 35, the capturing device 21 and the advertising system 23 are described in greater details in FIGS. 2 and 3.

System 1003 provides the combined functionality of system 1001 and 1002. Additionally system 1003 provides an option to identify the user that arrives at the parking lot by the capturing device 21. In such a case the capturing device 21 captures the image of the vehicle and sends it to a driver recognition module 31 which extracts the plate number from the image and sends the identification of the user that is associated with the plate number to the display control module 24.

It should be noted that though FIG. 1A, FIG. 1B FIG. 2 FIG. 3 and FIG. 4 disclose a system with front projecting screen material the disclosure is for the purpose of describing particular embodiments only and is not intended to be limiting to front projecting screen material and does not preclude the embodiment of rear projection in the architecture disclosed by these figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that, in some alternative implementations, the functions noted in the block of a figure may occur out of the order noted in the figures. For example, two blocks shown in succession may, in fact, be executed substantially concurrently, or the blocks may sometimes be executed in the reverse order, depending upon the functionality involved.

What is claimed is:

1. A parking gate barrier rod projecting system, the system comprising:

a projection screen material attached to at least a portion of a parking gate barrier rod; and a projector, wherein said projector being adapted to project digital media content on said projection screen material; wherein said digital media content being adapted to be fitted on said projection screen material to thereby exposing said digital media content to a person in a vehicle arriving at said parking gate barrier rod.

2. The parking gate barrier rod of claim 1, wherein said projection screen material comprises a high gain projection screen material.

3. The parking gate barrier rod projecting system of claim 1, wherein said system further comprising a camera; wherein said camera is configured for identifying when said parking gate barrier rod being opened and for sending a control command to said projector upon said identifying, wherein said projector is further configured for stopping or for darkening said projecting upon said receiving said control command.

4. The parking gate barrier rod projecting system of claim 1, wherein said system further comprising a gate positioning sensor; wherein said gate positioning sensor is configured for identifying when said parking gate barrier rod being opened and for sending a control command to said projector upon said identifying, wherein said projector is further configured for stopping or for darkening said projecting upon said receiving said control command.

5. The parking gate barrier rod projecting system of claim 1; further comprising a car recognition module, a capturing device and a display control module; wherein said capturing device is configured for capturing an image of said vehicle and for transferring said image to said car recognition module and wherein said car recognition module is configured for extracting a car plate number from said image and for transferring said plate number to said display control module; wherein said display control module is configured for identifying a user associated with said plate number and for selecting said media content according to a profile of said user to, thereby personalizing said media content.

6. The parking gate barrier rod projecting system of claim 1 further comprising an application and a display control module; wherein said application is configured for identifying an arrival of a user of said application at said parking gate barrier rod and for transferring said user identification to said display control module; wherein said display control module is configured for selecting said media content according to a profile of said user to, thereby, personalizing said digital media content in accordance with said user.

7. The parking gate barrier rod system of claim 1, wherein said projecting screen material being front projecting screen material.

8. The parking gate barrier rod system of claim 1, wherein said projecting screen material being rear projecting screen material.

9. The parking gate barrier rod projecting system of claim 1 further comprising an advertising system.

10. A parking gate barrier rod projecting system, the system comprising
a car recognition module,
a capturing device and
a display control module;
wherein said capturing device is configured for capturing an image of a vehicle arriving at a parking gate barrier rod and for transferring said image to said car recognition module and wherein said car recognition module is configured for extracting a car plate number from said image and for transferring said plate number to said display control module; wherein said display control module is configured for identifying a user associated with said plate number and for selecting media content according to a profile of said user and for transferring said media content to said projector for projecting said media content on said parking gate barrier rod.

11. The parking gate barrier rod projecting system of claim 10 wherein said capturing device being a camera.

12. The parking gate barrier rod projecting system of claim 10 further comprising an advertising system.

13. A parking gate barrier rod projecting system comprising
an application; and
a display control module; wherein said application is configured for identifying the arrival of a user of said application at a parking gate barrier rod and for transferring said user identification to said display control module; wherein said display control module is configured for selecting said media content according to a profile of said user and for transferring said media content to a projector for projecting said media content on said parking gate barrier rod to, thereby, personalizing said media content in accordance with said user.

14. The parking gate barrier rod projecting system of claim 13 further comprising an advertising system.

* * * * *